United States Patent
Voisine et al.

(10) Patent No.: US 8,783,953 B2
(45) Date of Patent: Jul. 22, 2014

(54) LOW FRICTION SEAL FOR BEARINGS

(75) Inventors: James Voisine, Burlington, CT (US); Bradley Smith, New Britain, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 13/544,458

(22) Filed: Jul. 9, 2012

(65) Prior Publication Data

US 2013/0022299 A1    Jan. 24, 2013

Related U.S. Application Data

(60) Provisional application No. 61/510,232, filed on Jul. 21, 2011.

(51) Int. Cl.
  *F16C 33/74* (2006.01)
  *F16C 23/04* (2006.01)
  *F16C 11/06* (2006.01)
  *F16J 15/52* (2006.01)

(52) U.S. Cl.
  CPC ............. *F16C 11/0676* (2013.01); *F16J 15/52* (2013.01); *F16C 33/74* (2013.01)
  USPC ............ 384/147; 384/140; 384/206; 277/635

(58) Field of Classification Search
  USPC ......... 384/130, 143, 147, 148, 151, 152, 153, 384/203, 206, 477, 481, 482, 484, 486, 384/140; 277/634–636
  See application file for complete search history.

(56) References Cited

U.S. PATENT DOCUMENTS

| | | | |
|---|---|---|---|
| 2,630,356 A | | 3/1953 | Johnson |
| 3,591,192 A | | 7/1971 | Sharp |
| 3,700,297 A | | 10/1972 | Fickenwirth |
| 3,814,446 A | * | 6/1974 | Derman ........................ 277/366 |
| 3,900,408 A | | 8/1975 | Turner |

(Continued)

FOREIGN PATENT DOCUMENTS

| | | |
|---|---|---|
| DE | 2755502 A1 | 6/1979 |
| DE | 8309873 | 9/1983 |

(Continued)

OTHER PUBLICATIONS

Machine translation of FR 2171567 printed on Aug. 8, 2013.

(Continued)

*Primary Examiner* — James Pilkington
(74) *Attorney, Agent, or Firm* — MKG, LLC

(57) ABSTRACT

A bearing assembly includes an annular inner member defining a first outer surface and a first inner surface, and a shaft extending therefrom. The bearing assembly includes an annular outer member defining a second outer surface and a second inner surface which is adapted to engage a recess defined in the first outer surface. An annular flexible seal defines a base adapted to engage the outer member, a head adapted to engage a groove defined in one of the inner member or the shaft, and a neck having a curvilinear cross-section which is adapted to bias the base toward the recess and the head toward the groove. The flexible seal is positioned adjacent to one end of the outer member and extends between the inner member and outer member. An annular low-friction liner has a cross-section that defines an interior area adapted to engage the flexible seal head.

4 Claims, 9 Drawing Sheets

(56) References Cited

U.S. PATENT DOCUMENTS

| | | | |
|---|---|---|---|
| 4,080,013 A | | 3/1978 | Koch |
| 4,089,095 A | | 5/1978 | Becker |
| 4,109,976 A | * | 8/1978 | Koch ............................ 384/192 |
| 4,210,405 A | | 7/1980 | Jesswein |
| 4,239,243 A | | 12/1980 | Bainard et al. |
| 4,311,316 A | | 1/1982 | Cather, Jr. |
| RE31,298 E | | 7/1983 | Herbenar |
| 4,447,094 A | | 5/1984 | Trudeau |
| 4,674,164 A | | 6/1987 | McCloskey |
| 5,004,248 A | | 4/1991 | Messenger et al. |
| 5,033,872 A | | 7/1991 | Ueno |
| 5,133,609 A | | 7/1992 | Ishiguro |
| 5,222,816 A | | 6/1993 | Kondoh |
| 5,242,228 A | | 9/1993 | Hattori |
| 5,419,642 A | | 5/1995 | McLarty |
| 5,480,231 A | | 1/1996 | Sasaki |
| 5,573,336 A | | 11/1996 | Maroney |
| 5,577,741 A | | 11/1996 | Sink |
| 5,655,845 A | | 8/1997 | Lampart |
| 6,217,031 B1 | * | 4/2001 | Catalano et al. ............... 277/549 |
| 6,325,544 B1 | | 12/2001 | Sasaki |
| 6,626,575 B2 | | 9/2003 | Hartl |
| 6,652,179 B2 | * | 11/2003 | De Freitas ..................... 277/635 |
| 6,955,473 B2 | * | 10/2005 | Reddehase et al. ........... 384/192 |
| 7,017,890 B2 | | 3/2006 | Rechtien |
| 7,244,074 B2 | | 7/2007 | Abels |
| 7,464,968 B2 | * | 12/2008 | Sakazaki et al. .............. 277/650 |
| 7,547,146 B2 | | 6/2009 | Kinno |
| 7,568,840 B2 | | 8/2009 | Smith |
| 7,654,766 B2 | | 2/2010 | Zuge |
| 7,658,546 B2 | | 2/2010 | Clarke |
| 8,038,351 B2 | * | 10/2011 | Arnold et al. ................. 384/152 |
| 2003/0095729 A1 | | 5/2003 | Post |
| 2003/0187512 A1 | | 10/2003 | Frederick |
| 2006/0098908 A1 | | 5/2006 | Clarke |
| 2007/0019895 A1 | | 1/2007 | Smith |
| 2007/0065057 A1 | | 3/2007 | Smith |
| 2008/0040886 A1 | | 2/2008 | Arnold |
| 2011/0091143 A1 | | 4/2011 | Murphy |
| 2012/0248723 A1 | * | 10/2012 | Harper et al. ................. 384/130 |

FOREIGN PATENT DOCUMENTS

| | | |
|---|---|---|
| DE | 3725404 A1 | 3/1989 |
| DE | 3725404 C2 | 8/1989 |
| DE | 10256334 A1 | 6/2004 |
| DE | 102008029449 A1 | 12/2009 |
| EP | 553565 A2 | 8/1993 |
| FR | 2171567 | 9/1973 |
| GB | 2400149 A | 6/2004 |
| JP | 06123315 A | 5/1994 |
| JP | 2002054644 A | 2/2002 |
| JP | 2007100799 A | 4/2007 |
| JP | 2002139033 A | 5/2007 |

OTHER PUBLICATIONS

International Search Report in corresponding PCT Application No. PCT/US2012/047331 issued on Oct. 18, 2012.

International Preliminary Report on Patentability issued in corresponding PCT Application No. PCT/US2012/047331 dated Jul. 8, 2013.

* cited by examiner

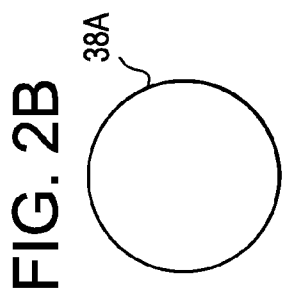
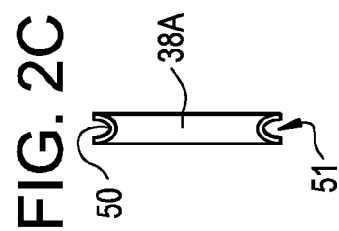
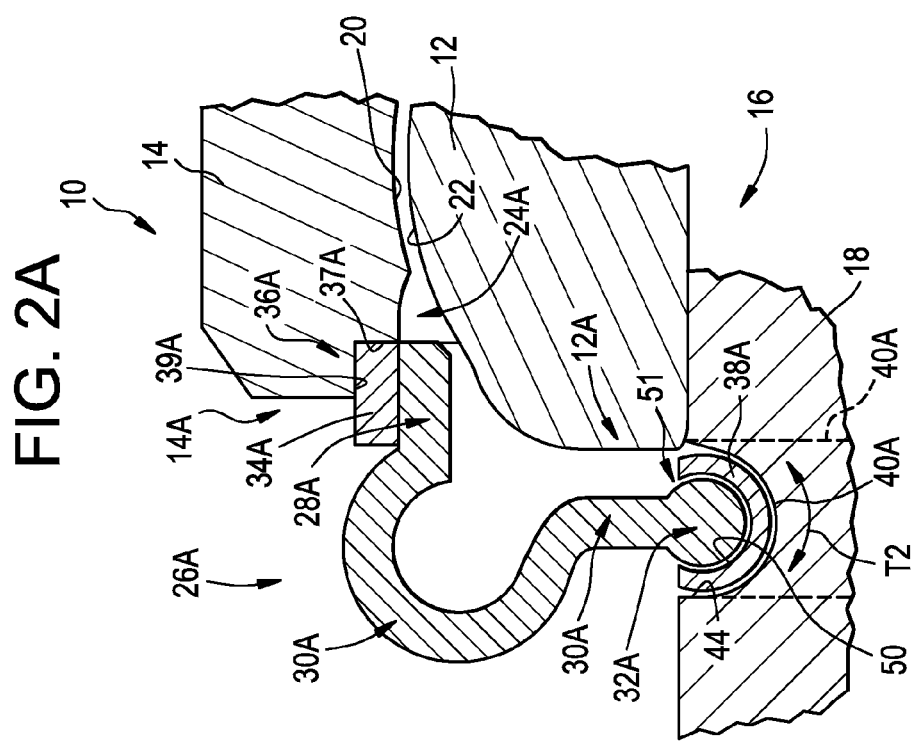

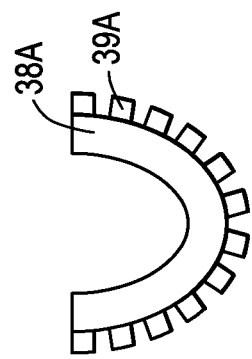
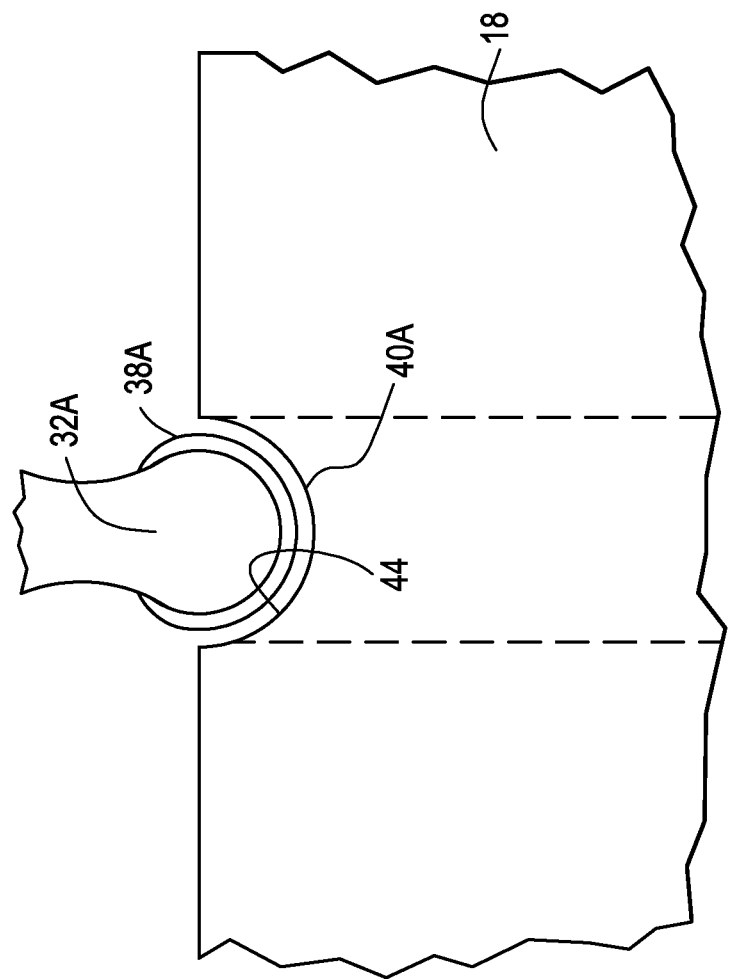

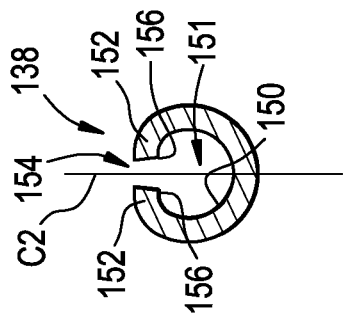
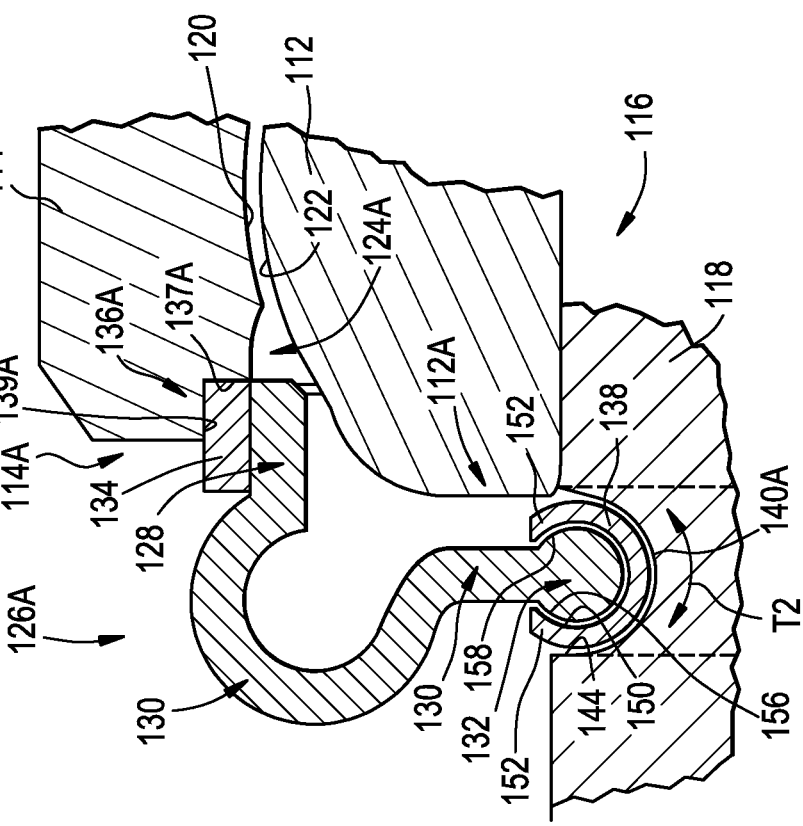

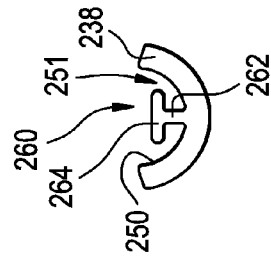
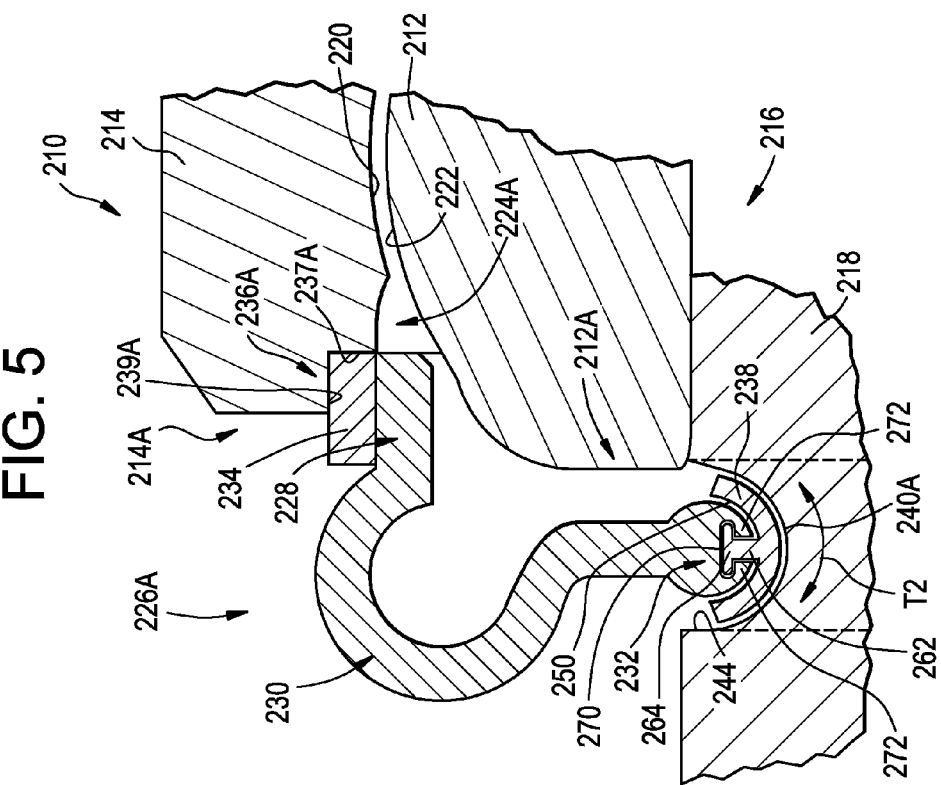

LOW FRICTION SEAL FOR BEARINGS

CROSS-REFERENCE TO RELATED APPLICATION

This application claims the benefit of U.S. Provisional Patent Application Ser. No. 61/510,232; filed on Jul. 21, 2011, which is incorporated herein by reference in its entirety.

TECHNICAL FIELD

The present disclosure relates generally to a seal for a bearing and, more specifically, to a low-friction material coupled to the seal that facilitates movement of components of the bearing relative to one another.

BACKGROUND OF THE INVENTION

Bearings have traditionally been comprised of an inner and an outer component that rotate relative to one another. A lubricant may be or may not be present in the space between the inner and outer component. The addition of a lubricant is used to decrease friction between the inner and outer component.

Sometimes, dirt, debris and other foreign matter can enter the space between the inner and outer component, thereby contaminating and degrading the effectiveness of the lubricant. Such contamination and degradation can result in wear and premature failure of the bearing. Thus, seals have typically been used to reduce the potential for dirt, debris and other foreign matter from entering into the space between the inner and outer component. Such seals have, in some cases, resulted in an increase in force necessary to rotate the components relative to one another.

SUMMARY OF THE INVENTION

According to aspects illustrated herein, there is provided a sealing system for a bearing assembly including a flexible seal and one or more low-friction liners disposed on the flexible seal.

According to other aspects illustrated herein, there is provided a bearing assembly having an inner member that defines an outer surface and an inner surface. The bearing assembly includes an outer member that defines an inner surface which is adapted to engage the inner member outer surface. A flexible seal defines a base and a head, and the flexible seal is positioned adjacent to one end of the outer member and extends between the inner member and the outer member. A low-friction liner is disposed on the flexible seal head and adapted to engage a groove defined in the inner member.

According to still other aspects illustrated herein, there is provided a method for installing a sealing system for a bearing that includes providing an inner member that defines an outer surface, an inner surface, and a groove therein. The method includes providing an outer member that defines an inner surface which is adapted to engage the inner member outer surface. The method further includes providing a flexible seal that defines a base and a head. A low-friction liner is provided, adapted to engage the groove, and is disposed on the groove or the flexible seal head. The flexible seal base is positioned adjacent to one end of the outer member extending between the inner member and the outer member; and the flexible seal head is positioned in the groove.

BRIEF DESCRIPTION OF THE DRAWINGS

Referring now to the Figures, which are exemplary embodiments, and wherein the like elements are numbered alike:

FIG. 2A is an enlarged view of a portion of the spherical bearing of FIG. 1;

FIG. 2B is a end view of a liner positioned on a portion of the spherical bearing of FIG. 1;

FIG. 2C is a side view of the liner positioned of FIG. 2B;

FIG. 2D is an enlarged view of a portion of the spherical bearing of FIG. 1 illustrating the integral formation of the liner and the seal for fitting the liner into the groove in the shaft;

FIG. 2E is a cross sectional view of an alternative embodiment of the liner of FIG. 2A;

FIG. 3 is an enlarged view of a portion of the spherical bearing of FIG. 1 illustrating a seal having a liner with a lip extending therefrom;

FIG. 4 is a cross sectional view of the liner of FIG. 3;

FIG. 5 is an enlarged view of a portion of the spherical bearing of FIG. 1 illustrating a seal with a liner anchored thereto;

FIG. 6 is a cross sectional view of the liner of FIG. 5;

DETAILED DESCRIPTION OF PREFERRED EMBODIMENTS

Figure 1B:
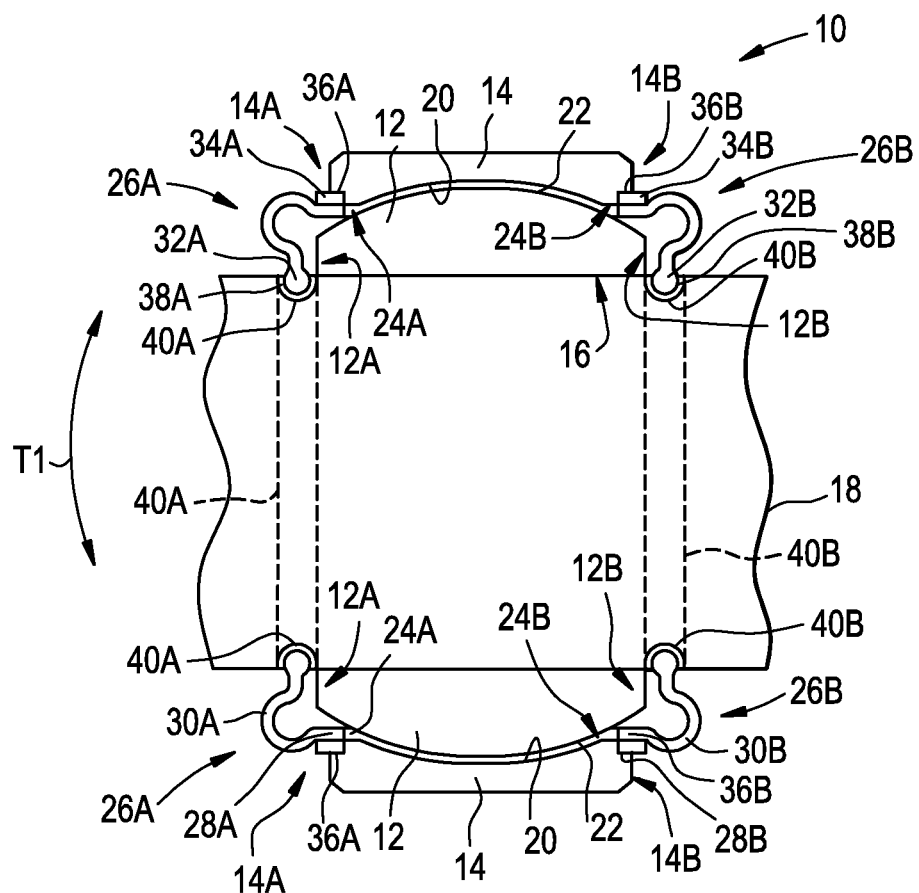
FIG. 1B is a cross sectional view of the spherical bearing of FIG. 1A.
Figure 1A:
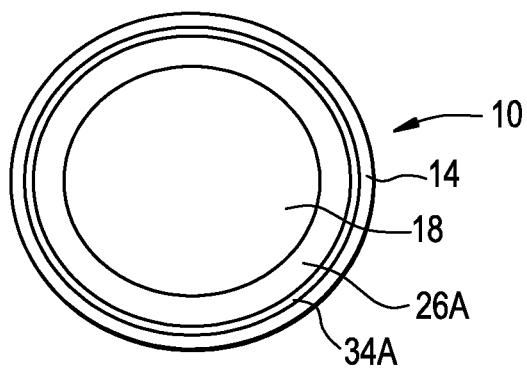
FIG. 1A is an end view of a spherical bearing and a seal of the present invention.

As shown in FIGS. 1A, 1B and 2A, a spherical plain bearing assembly is designated generally by the reference number 10 and is hereinafter referred to as the "bearing assembly 10." The bearing assembly 10 includes an inner member such as a ball 12 positioned in an outer member such as an outer race 14. The ball 12 defines a bore 16 extending completely therethrough and is adapted to receive a portion of a shaft 18 or other component therein. While the bore 16 is described as extending completely through the ball 12, the present invention is not limited in this regard as the bore may extend only partially into the ball. In one embodiment, the ball 12 is integral with or forms part of the shaft 18 or other component.

In the illustrated embodiment, the outer race 14 generally has a cylindrical exterior and defines a concave inner surface 20 contoured to a shape complementary to a convex outer surface 22 of the ball 12. The concave inner surface 20 and the convex outer surface 22 rotatingly engage one another and cooperate to guide movement of the ball 12 relative to the outer race 14 and to convey loads transmitted therebetween. A lubricant (not shown) is disposed in an area between the concave inner surface 20 and the convex outer surface 22 for reducing friction therebetween. While a spherical plain bearing has been shown and described, the present invention is not limited in this regard as the features and elements described herein with respect to the spherical plain bearing apply to other bearing assemblies, such as, for example, ball bearings, journal bearings, needle bearings, thrust bearings and the like, without departing from the broader aspects of the invention.

While the exterior of the outer race 14 has been shown and described as being cylindrical, the present invention is not limited in this regard as the outer race can assume any practical shape or be part of another component, such as, for example a housing, without departing from the broader aspects of the invention. Although, the lubricant is described as being disposed between the concave inner surface 20 and the convex outer surface 22 for reducing friction therebetween, the present invention is not limited in this regard as other configurations for reducing friction can also be employed, such as but not limited to use of a low friction liner disposed between the concave inner surface and the convex outer surface and employing self lubricating surfaces on one or both of the concave inner surface and the convex outer surface.

As illustrated in FIGS. 1A and 2A, the ball 12 and the outer race 14 define: a first gap 24A located therebetween and adjacent to one end, a first end 14A of the outer race; and a second gap 24B located therebetween and adjacent to an opposing end, a second end 14B of the outer race. The first and second gaps 24A and 24B extend circumferentially around the ends 14A and 14B of the outer race 14, respectively. The first and second gaps 24A and 24B are in communication with the area located between the concave inner surface 20 and the convex outer surface 22.

Referring to FIGS. 1A and 2A, a first flexible seal 26A is positioned adjacent to the first end 14A of the outer race 14 and extends across the first gap 24A, from the outer race to the ball 12; and a second flexible seal 26B is positioned adjacent to the second end 14B of the outer race and extends across the second gap 24B, from the outer race to the ball. While use of the flexible seal has been shown and described with a spherical plain bearing, the present invention is not limited in this regard as the flexible seal may be used with other bearing assemblies, such as, for example, ball bearings, journal bearings, needle bearings, thrust bearings and the like, without departing from the broader aspects of the invention.

Referring to FIGS. 1A, 1B and 2A, a first flexible seal 26A is generally annular corresponding to the shape of the shaft 18 positioned within the bore 16 of the ball 12. The first flexible seal 26A defines a cross section which includes a base 28A, a neck 30A and terminates in a bulbous head 32A. The neck 30A extends radially outward and laterally away from the base 28A and forms a semi-circular concave loop turning radially inward and laterally inward and then terminating in the bulbous head 32A. Accordingly, the neck 30A defines a semi-circular inwardly facing concave loop for providing spring-like tension for retaining the flexible seal 26A in place as further described below. A second flexible seal 26B corresponding to the flexible seal 26A is generally annular and defines a cross section which includes a base 28B and having a curved neck 30B and extending outwardly from the base and terminating in a bulbous head 32B.

In the illustrated embodiment, a first annular plate 34A, for example a metal ring, is affixed to the base 28A of the first flexible seal 26A; and a second annular plate 34B is affixed to second base 28B of the second flexible seal 26B. At least a portion of the first annular plate 34A is positioned in a first recess 36A defined by the outer race; and at least a portion of the second annular plate 34B is positioned in a second recess 36B defined by the outer race. The first recess 36A is defined by circumferential walls 37A and axial extending walls 39A which engage and retain the first annular plate 34A; and second recess 36B is defined by similar circumferential walls and axial extending walls which engage and retain the second annular plate 34A.

A first liner 38A is secured to the head 32A of the seal 26A and a second liner 38B is secured to the head 32B of the second seal 26B. Each liner 38A and 38B is secured to the head of the respective seal by a suitable adhesive. In the illustrated embodiment as shown in FIGS. 2B and 2C, the liners 38A and 38B are annular with a concave semi-circular cross section facing radially outward and defining an inner surface 50 and an interior area 51 for receiving the respective flexible seal head 32A or 32B therein.

The seals 26A and 26B are manufactured from a suitably resilient material such as for example rubber or a synthetic rubber. Accordingly, the seals 26A and 26B may be compressed and are flexible, durable and wear-resistant such that they provide an appropriate sealing means for the bearing assembly 10 as described above. The liners 38A and 38B are fabricated from a suitably hard material exhibiting a lower coefficient-of-friction than the material from which the seals 26A and 26B are fabricated. Accordingly, the liners 38A and 38B move or rotate within their respective grooves 40A and 40B in shaft 18 with less friction than the relative movement between the seals 26A and 26B within the respective grooves 40A and 40B if the liners 38A and 38B were not inserted therebetween.

In one embodiment, the liners 38A and 38B are manufactured from low friction and/or wear resistant material such as polytetrafluoroethylene (PTFE). While the liners 38A and 38B are described as being manufactured from PTFE, the present invention is not limited in this regard as the liners 38A and 38B may be fabricated from other low friction and/or wear resistant material such as for example, thermoplastics including but not limited to acetal plastics. In another embodiment and as shown in FIG. 2D, the liner 38A is integrally formed with the seal 26A such as for example by applying a hard coating to the flexible seal head 32A where such hard coating exhibits a lower coefficient-of-friction than the material from which the seal 26A is fabricated. In yet another embodiment and as shown in FIG. 2E, the geometry of the liner 38A is shaped to achieve a lower coefficient-of-friction than the material from which the seal 26A is fabricated such as for example by the integral formation of ridges 39A along the periphery of the liner 38A.

While each of the liners 38A and 38B are described as being secured to a respective head 32A and 32B by a suitable adhesive, the present invention is not limited in this regard as the liner or other low friction and/or wear resistant material can be disposed on the head, including but not limited to, by application of a coating and or use of mechanical fasteners. Although the cross section of each head 32A and 32B is described and shown as being bulbous and the cross section of each liner 38A and 38B as being semi-circular, the present invention is not limited in this regard as the head and the liner may be of any suitable cross section, including but not limited to triangular, elliptical and tee-shaped cross sections, without departing from the broader aspects disclosed herein.

In the illustrated embodiment of FIGS. 1A and 2A, the flexible seal head 32A with the liner 38A secured thereto is disposed in a complementarily shaped groove 40A formed circumferentially around the shaft 18 at a location adjacent to one end 12A of the ball 12. Similarly, the flexible seal head 32B with the liner 38B secured thereto is disposed in a complementarily shaped groove 40B formed circumferentially around the shaft 18 at a location adjacent to an opposing end 12B of the ball 12.

The resilient material of the flexible seal 26A allows the seal to be compressed prior to positioning the liner 38A disposed on head 32A in the groove 40A. The resilient material is subsequently expanded to exert forces on surface 44 of the groove 40A to releasably hold the head and liner in the groove. The flexible seal 26A is biased to urge the head and liner 32A/38A into the groove 40A to form a seal between the head, liner and groove (e.g., in the general direction shown by the arrow T1). Similarly, the resilient material of the flexible seal 26B allows the seal to be compressed prior to positioning the liner 38B disposed on head 32B in the groove 40B. The resilient material is subsequently expanded to exert forces on surface 44 of the groove 40B to releasably hold the head and liner in the groove. The flexible seal 26B is biased to urge the head and liner 32B/38B into the groove 40B to form a seal between the head, liner and groove.

In one embodiment, each neck 30A and 30B is configured to have a spring rate sufficient to bias and maintain the respective head 32A and 32B of each of respective seals 26A and 26B into respective grooves 40A and 40B. The seals 26A and 26B have utility in mitigating the migration of debris into the first and second gaps 24A and 24B and the area between the concave inner surface 20 and the convex outer surface 22. The low friction liners are configured to reduce friction between the seals and the respective grooves in response to circumferential and/or side to side movement (e.g., in the direction shown by the arrow T2) of the liner relative to the groove.

While the plate 34A and 34B of each the respective flexible seals 26A and 26B are shown and described as abutting and being removably secured to the first and second recesses 36A and 36B, respectively, and the respective head and liner 32A/38A and 32B/38B of the respective seals 26A and 26B are shown and described as being disposed in the grooves 40A and 40B, respectively, the present invention is not limited in this regard as other configurations are contemplated including but not limited to, grooves being formed in the ball 12 for receiving the head and liner of each of the seals therein, grooves being formed in the outer race 14 for receiving the head and liner of each of the seals therein and the plate and/or base being configured to be removably secured to the shaft 18 or the ball.

The bearing assembly 110 of FIGS. 3 and 4 is similar to the bearing assembly 10 of FIGS. 1 and 2, thus like elements are assigned like reference numbers preceded by the numeral 1. The bearing assembly 110 includes a ball 112 positioned in an outer race 114. The ball 112 defines a bore 116 extending either part of the way or completely therethrough and is adapted to receive a portion of a shaft 118. The ball 112 and the outer race 114 define: a first gap 124A located therebetween and adjacent to one end 114A of the outer race; and a second gap (not shown), similar to the first gap 124A, located therebetween and adjacent to an opposing end (not shown) of the outer race. FIG. 3 further shows: one end 112A and outer surface 122 of the ball 112; inner surface 120 of the outer race 114; circumferential walls 137A and axial extending walls 139A of recess 136A defined by the outer race 114; and surface 144 of groove 140A formed circumferentially around the shaft 118.

A flexible seal 126A is positioned adjacent to the end 114A of the outer race 114 and extends across the first gap 124A from the outer race to the ball 112. Another flexible seal (not shown), similar to the seal 126A, is positioned on an opposing side (not shown) of the bearing assembly 110. The seal 126A and the other seal each include a base 128, a neck 130 and terminate in a bulbous head 132. The neck 130 extends radially outward and laterally away from the base 128 and forms a semi-circular concave loop turning radially inward and laterally inward and then terminating in the bulbous head 132. Accordingly, the neck 130 defines a semi-circular inwardly facing concave loop for providing spring-like tension for retaining the flexible seal 126A in place.

Each of the seal 126A and other seal is manufactured from a resilient material such as rubber or a synthetic rubber. In the illustrated embodiment, a plate 134, for example a metal strip, is affixed to the base 128 of each of the seal 126A and the other seal. At least a portion of the plate 134 of the seal 126A is positioned in a recess 136A defined by the outer race 114; and at least a portion of the other seal is positioned in another recess (not shown) defined by the outer race. The head 132 of each of the seal 126A and the other seal include a liner 138 secured thereto.

As illustrated in FIGS. 3 and 4, the liner 138 is annular with a concave semi-circular cross section facing radially outward and defining an inner surface 150 and an interior area 151 for receiving the flexible seal head 132 therein. The liner 138 terminates in a pair of opposing flanges or lips 152 projecting inwardly from outer ends of the liner. The lip 152 terminates short of a central axis C2 of the liner 138, thereby defining an opening 154 between the lips. The opening 154 is in communication with the interior area 151. The opening 154 and interior area 151 are sized so that the head 132 can be inserted into the interior area when compressed and subsequently expanded to removably retain the liner 138 on the head. In the illustrated embodiment, the lips 152 each include an abutment surface 156 which engages a shoulder 158 defined by a portion of the head 132 adjacent to the neck 130, to removably retain the liner 138 on the head.

The bearing assembly 210 of FIGS. 5 and 6 is similar to the bearing assembly 10 of FIGS. 1 and 2, thus like elements are assigned like reference numbers preceded by the numeral 2. The bearing assembly 210 includes a ball 212 positioned in an outer race 214. The ball 212 defines a bore 216 extending either part of the way or completely therethrough and is adapted to receive a portion of a shaft 218. The ball 212 and the outer race 214 define: a first gap 224A located therebetween and adjacent to one end 214A of the outer race; and a second gap (not shown), similar to the first gap 224A, located therebetween and adjacent to an opposing end (not) of the outer race. FIG. 5 further shows: one end 212A and outer surface 222 of the ball 212; inner surface 220 of the outer race 214; circumferential walls 237A and axial extending walls 239A of recess 236A defined by the outer race 214; and surface 244 of groove 240A formed circumferentially around the shaft 218.

A flexible annular seal 226A is positioned adjacent to the end 214A of the outer race 214 and extends across the first gap 224A from the outer race to the ball 212. Another flexible seal (not shown), similar to the seal 226A, is positioned on an opposing side (not shown) of the bearing assembly 210. The seal 226A and the other seal each have a cross section which includes a base 228, a neck 230 and terminates in a bulbous head 232. The neck 230 extends radially outward and laterally away from the base 228 and forms a semi-circular concave loop turning radially inward and laterally inward and then terminating in the bulbous head 232. Accordingly, the neck 230 defines a semi-circular inwardly facing concave loop for providing spring-like tension for retaining the flexible seal 226A in place.

Each of the seal 226A and other seal is manufactured from a resilient material such as rubber or a synthetic rubber. An annular plate 234, for example a metal ring, is affixed to the base 228 of each of the seal 226A and the other seal. At least a portion of the plate 234 of the seal 226A is positioned in a recess 236A defined by the outer race 214; and at least a portion of the plate 234 of the other seal is positioned in another recess defined by the outer race. The head 232 of each of the seal 226A and the other seal include a liner 238 secured thereto.

As illustrated in FIGS. 5 and 6, the liner 238 is annular with a truncated concave circular cross section (e.g., a cross section having an angle of less than 360 degrees). The cross section faces radially outward and defines an inner surface 250 and an interior area 251 for receiving the flexible seal head 232 therein. The liner 238 includes a protrusion such an anchor 260 projecting from the inside surface 250 of the liner. The anchor 260 defines a stem 262 extending from the inside surface 250 and terminating in a disc shaped plate 264 having a diameter greater than that of the stem. The head 232 defines a receiving terminus such as a pocket 270 disposed between two opposing lobes 272 which form a distal end of the head. The pocket 270 has a shape complementary to the anchor 260 and is configured for receiving the anchor therein. The lobes 272 are resilient and configured to be flexed away from one another to receive the anchor therein and then resiliently return to an un-flexed state, thereby securing the anchor 260 in the pocket 270. In one embodiment, the liner 238 shown in FIG. 5 is molded or cast into the seal 230 and thereby permanently attached thereto.

Figure 7:
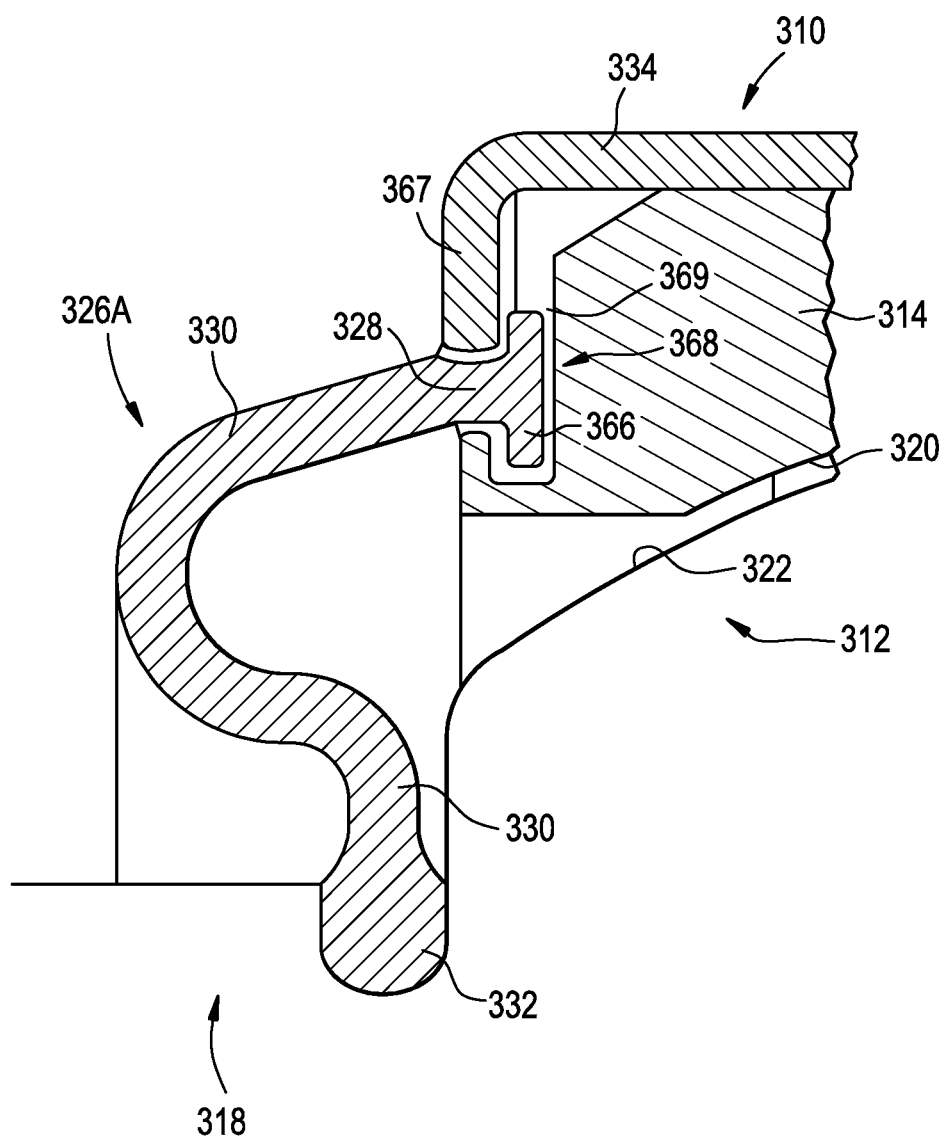
FIG. 7 is an enlarged view of a portion of the spherical bearing of FIG. 1 illustrating a seal having a liner mating with a portion of the outer ring.

The bearing assembly 310 of FIG. 7 is similar to the bearing assembly 10 of FIGS. 1 and 2, thus like elements are assigned like reference numbers preceded by the numeral 3. However, the ball 312 is integral with a shaft 318. In addition, the flexible seal 326A includes a base terminus 328 terminating in a tee-shaped head 366. The annular plate 334 has a leg 367 extending toward the ball 312, to form an L-shaped cross section. The annular plate 334, the leg 367 and the outer race 314 cooperate to define a pocket 368 complementary to and for receiving the tee-shaped head 366. A third low-friction liner 369 is formed around and secured to the tee-shaped head 366, for reducing friction between the flexible seal 326A and the outer ring 314 and the leg 367. FIG. 7 further shows: outer surface 322 of the ball 312; inner surface 320 of the outer race 314; and base 328, neck 330 and head 332 of the seal 326A.

Figure 8:
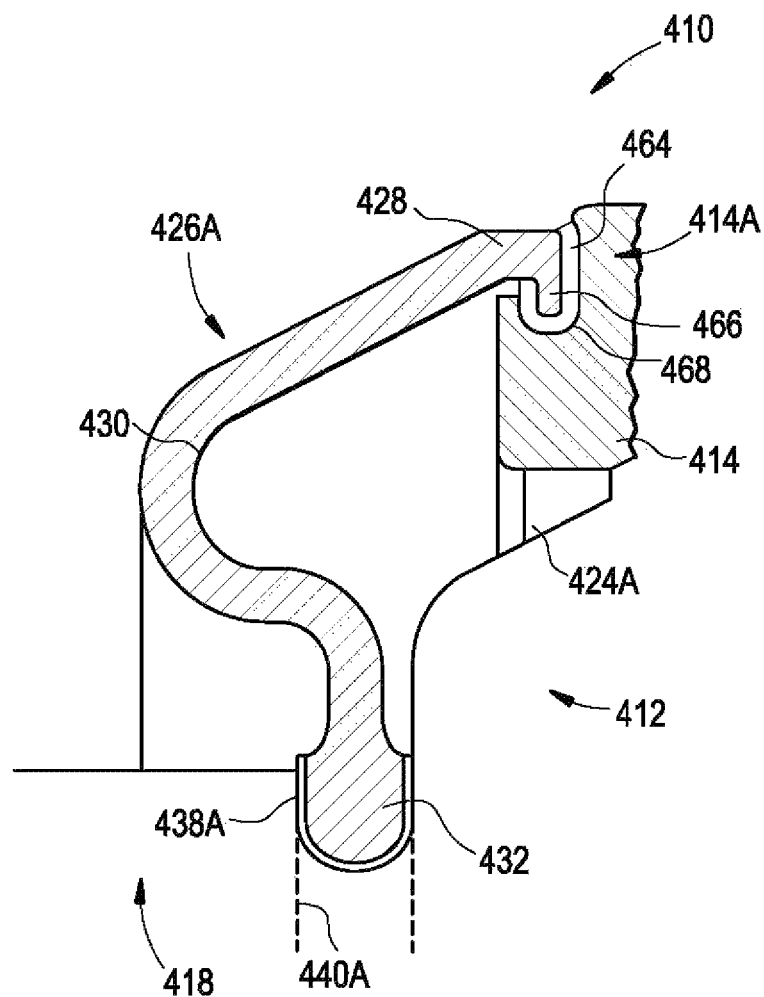
FIG. 8 is an enlarged view of a portion of the spherical bearing of FIG. 1 illustrating a seal having a liner mating with a another portion of the outer ring.

The bearing assembly 410 of FIG. 8 is similar to the bearing assembly 10 of FIGS. 1 and 2, thus like elements are assigned like reference numbers preceded by the numeral 4. However, the ball 412 is integral with a shaft 418. A flexible annular seal 426A is positioned adjacent to the end 414A of the outer race 414 and extends across the first gap 424A from the outer race 414 to the ball 412. The seal 426A has a cross section which includes a base 428, a neck 430 and terminates in a bulbous head 432. The neck 430 extends outward and laterally away from the base 428 and forms a substantially concave loop turning radially inward and laterally inward and then terminating in the bulbous head 432. The flexible seal head 432 includes a liner 438A secured thereto. The flexible seal neck 430 defines a semi-circular inwardly facing concave loop for providing spring-like tension for retaining the flexible seal 426A and the liner 438A in place within groove 440A.

In addition, the flexible seal 426A includes a base portion 428 terminating in an L-shaped head 466. The outer ring 414 defines a pocket 468 complementary to and for receiving the L-shaped head 466. A third low-friction liner 464 is formed around and secured to the L-shaped head 466, for reducing friction between the flexible seal 426A and the pocket 468 in the outer ring 414.

Figure 9:
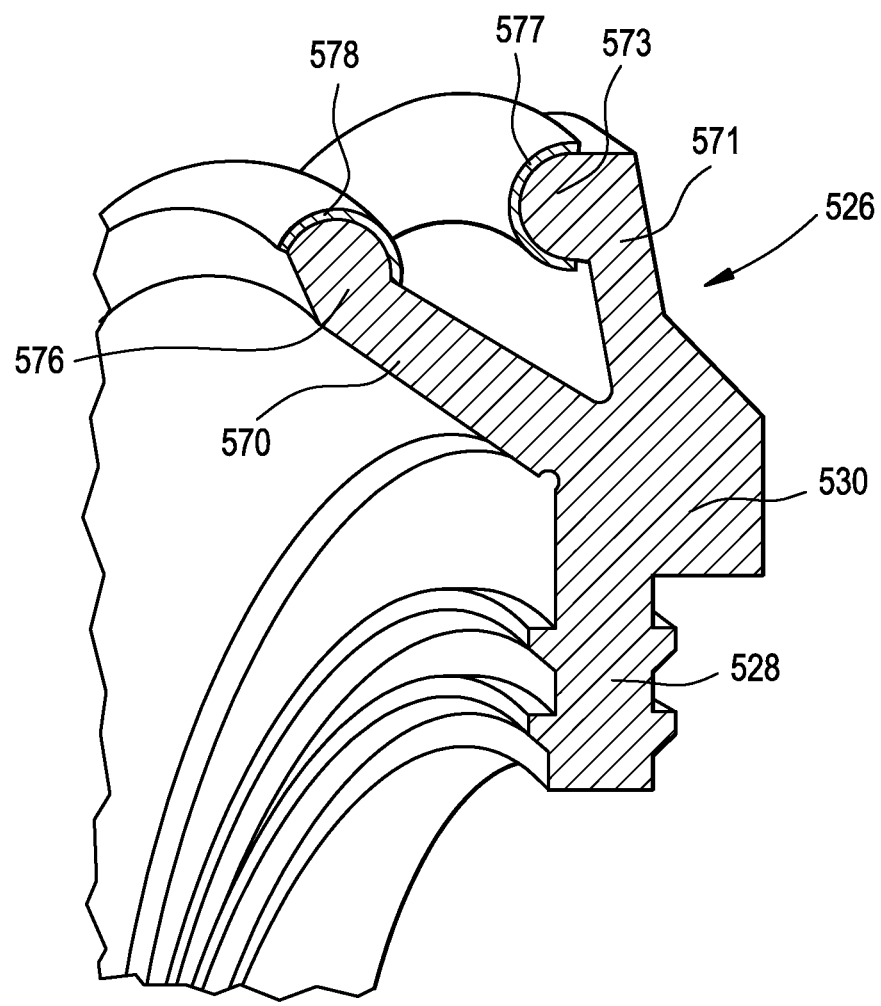
FIG. 9 is an enlarged view of a portion of the seal for a ball bearing, having a liner secured thereto.

FIG. 9 illustrates a flexible seal 526 for use in a ball bearing. The flexible seal 526 defines a base 528 a neck 530 extending from the base. A first leg 570 and a second leg 571 extend from the neck 530 in a generally Y-shaped orientation. The first leg 570 defines a first leg head 576 on a terminal end thereof; and the second leg 571 defines a second head 573 on a terminal end thereof. The first leg head 576 has a fourth low-friction liner 578 secured thereto; and the second leg head 573 has a fifth low-friction liner 577 secured thereto. The liners 577 and 578 have utility in reducing friction between the liners and complementary mating surfaces of one or more bearings.

Figure 10A:
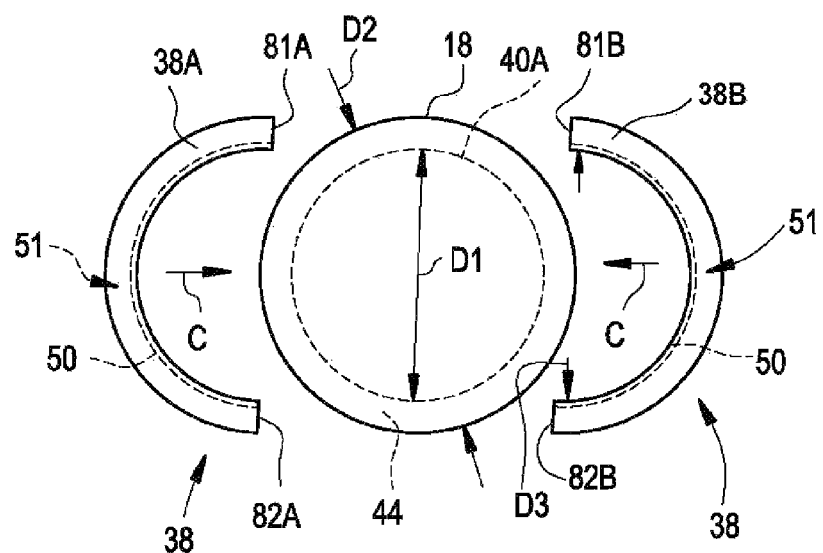
FIG. 10A is an enlarged view of a portion of the spherical bearing of FIG. 1 illustrating a structure for fitting the liner into the groove in the shaft.
Figure 10B:
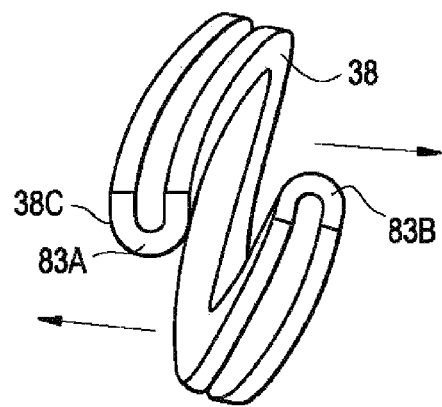
FIG. 10B is an enlarged view of the liner of FIG. 10A showing a cut in the liner and axial displacement thereof.

A method for installing the flexible seals of the present invention in a bearing assembly is shown in FIGS. 10A and 10B. A radially inward most portion of the groove 40A has a diameter D1; and the shaft 18 has an outside diameter D2, which is greater in magnitude than the diameter D1. In the illustrated embodiment, the liner 38 has an inside diameter D3 which is slightly lesser in magnitude than that of the diameter D1. In addition, the diameter D2 is of a greater magnitude than that of the diameter D3. In one embodiment, as illustrated in FIG. 7, the liner 38 is split into a first liner segment 38A and a second liner segment 38B. Splitting the liner 38 into the first liner segment 38A and the second liner segment 38B has utility in installation of the liner 38 into the groove 40A, for example, by enabling installation of the liner 38 into the groove 40A without having to flex the liner to increase the diameter D3 to fit over the shaft 18. Thus in one embodiment, the liner 38 is split into the first and second liner segments 38A and 38B and positioned on opposing sides of the shaft 18.

Still referring to FIG. 10A, the liner 38 is positioned in the groove 40A by moving the first and second liner segments 38A and 38B towards one another in the general direction shown by the arrows C over the groove, until transverse faces 81A and 82A of the first liner segment 38A engage transverse faces 81B and 82B of the second liner segment 38B, respectively. The transverse faces 81A and 82A are secured to the transverse faces 81B and 82B, respectively by an adhesive. Although the transverse faces 81A and 82A are described as being secured to the transverse faces 81B and 82B by an adhesive, the present invention is not limited in this regard as other mechanisms for securing the transverse faces 81A and 82A to the respective transverse faces 81B and 82B can be employed including, but not limited to, use of connectors, wire, tape, pins, hooks and the like. While the liner 38 is described as being split into two segments 38A and 38B, the present invention is not limited in this regard as other configurations can be employed, including but not limited to, heating the liner to increase the inside diameter D3 to a magnitude greater than the diameter D2 of the shaft 18 and subsequently contracting the liner into the groove 40A by cooling, and splitting the liner into more than two pieces. In addition and as shown in FIG. 10B, one embodiment comprises forming one cut through a cross section 38C of the liner 38 to enable opposing transverse faces 83A and 83B to be displaced axially from each other (e.g., twisted away from each other in opposite axial directions).

In one embodiment, the liner 38 is configured for installation in the groove 40A by one or more of the above described configurations, positioned in the groove and then the head 32 is removeably secured to the liner. In another embodiment, the liner 38 is configured for installation in the groove 40A by one or more of the above described configurations, the liner is removeably secured to the head 32 and then the liner and the head are positioned in the groove substantially simultaneously.

In summary, the method for installing a sealing system for a bearing includes providing an inner member that defines an outer surface, an inner surface, and a groove therein. The method includes providing an outer member that defines an inner surface which is adapted to engage the inner member outer surface. The method further includes providing a flexible seal that defines a base and a head. A low-friction liner is provided, adapted to engage the groove, and disposed on one of the groove or the flexible seal head. The flexible seal base is positioned adjacent to one end of the outer member extending between the inner member and the outer member; and the flexible seal head is positioned in the groove.

The low-friction liner may be divided into at least two liner segments wherein each liner segment defines at least one transverse face. The liner segments are displaced away from each other to position the liner segments in the groove and the liner segment transverse faces engage one another. An adhesive may be applied to at least one of the transverse faces of the liner segments. In addition, the low-friction liner may be disposed on the groove by forming at least one cut through a cross section of the low-friction liner thereby creating the opposing transverse faces, moving the opposing transverse faces away from one another in opposite axial directions, and positioning the liner segments in the groove. In another embodiment of the method disclosed herein, the low-friction liner may be disposed on the groove by heating the low-friction liner, cooling the inner member proximate to the groove, and positioning the liner in the groove.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for installing a sealing system for a bearing comprising:
   providing an inner member defining an outer surface and having a shaft extending therefrom, the shaft defining a groove therein;
   providing an outer member defining an inner surface adapted to engage the inner member outer surface;
   providing a flexible seal defining a base adapted to engage a recess defined in the inner surface of the outer member, a head adapted to engage the groove, and a neck having a curvilinear cross-section, the neck being adapted to bias the base toward the recess and the head toward the groove;
   providing a low-friction liner having a cross-section defining an interior area adapted to engage the flexible seal head;
   dividing the low-friction liner into at least two liner segments wherein each liner segment defines at least one transverse face;
   displacing the liner segments away from each other;
   disposing the low-friction liner on one of the groove or the flexible seal head by engaging the liner segment transverse faces with one another;
   positioning the flexible seal base adjacent to one end of the outer member extending between the inner member and the outer member; and
   positioning the flexible seal head in the groove.

2. The method for installing a sealing system in a bearing of claim 1 wherein engaging the liner segment transverse faces with one another comprises applying an adhesive to at least one of the transverse faces of the liner segments.

3. A method for installing a sealing system for a bearing comprising:
   providing an inner member defining an outer surface and having a shaft extending therefrom, the shaft defining a groove therein;
   providing an outer member defining an inner surface adapted to engage the inner member outer surface;
   providing a flexible seal defining a base adapted to engage a recess defined in the inner surface of the outer member, a head adapted to engage the groove, and a neck having a curvilinear cross-section, the neck being adapted to bias the base toward the recess and the head toward the groove;
   providing a low-friction liner having a cross-section defining an interior area adapted to engage the flexible seal head;
   forming at least one cut through a cross section of the low-friction liner thereby creating opposing transverse faces;
   moving the opposing transverse faces away from one another in opposite axial directions;
   positioning the liner segments on one of the groove or the flexible seal head;
   positioning the flexible seal base adjacent to one end of the outer member extending between the inner member and the outer member; and
   positioning the flexible seal head in the groove.

4. A method for installing a sealing system for a bearing comprising:
   providing an inner member defining an outer surface and having a shaft extending therefrom, the shaft defining a groove therein;
   providing an outer member defining an inner surface adapted to engage the inner member outer surface;
   providing a flexible seal defining a base adapted to engage a recess defined in the inner surface of the outer member, a head adapted to engage the groove, and a neck having a curvilinear cross-section, the neck being adapted to bias the base toward the recess and the head toward the groove;
   providing a low-friction liner having a cross-section defining an interior area adapted to engage the flexible seal head;
   heating the low-friction liner;
   cooling the inner member proximate to the groove;
   positioning the liner in the groove;
   positioning the flexible seal base adjacent to one end of the outer member extending between the inner member and the outer member; and
   positioning the flexible seal head in the groove.

* * * * *